US012785807B2

(12) United States Patent
Gabbay et al.

(10) Patent No.: US 12,785,807 B2
(45) Date of Patent: Nov. 3, 2026

(54) WAVELENGTH DIVISION MULTIPLEXING USING LIGHT SOURCES HAVING A COMMON WAVELENGTH

(71) Applicant: RFOPTIC LTD., Petah Tikva (IL)

(72) Inventors: David Gabbay, Marlboro, NJ (US); Avner Sharon, Herzliya (IL)

(73) Assignee: RFOPTIC LTD., Petah Tikva (IL)

( * ) Notice: Subject to any disclaimer, the term of this patent is extended or adjusted under 35 U.S.C. 154(b) by 214 days.

(21) Appl. No.: 18/637,493

(22) Filed: Apr. 17, 2024

(65) Prior Publication Data

US 2025/0330244 A1 Oct. 23, 2025

(51) Int. Cl.

*H04B 10/2575* (2013.01)
*H04B 10/294* (2013.01)
*H04B 10/63* (2013.01)
*H04B 10/50* (2013.01)

(52) U.S. Cl.

CPC ..... *H04B 10/25759* (2013.01); *H04B 10/294* (2013.01); *H04B 10/63* (2013.01); *H04B 10/503* (2013.01)

(58) Field of Classification Search

CPC ....................... H04B 10/25759; H04B 10/294; H04B 10/63; H04B 10/503

See application file for complete search history.

(56) References Cited

U.S. PATENT DOCUMENTS 4,584,658 A 4/1986 Ottobre et al.
4,665,372 A 5/1987 Schwartz
5,063,354 A 11/1991 Lauper et al.
5,332,975 A 7/1994 Young et al.
6,066,967 A 5/2000 Cahill et al.
6,597,208 B1 7/2003 Gabet et al.
6,768,827 B2 * 7/2004 Yoo .......................... G02B 6/12 398/43

(Continued)

OTHER PUBLICATIONS

Gabbay, U.S. Appl. No. 18/426,457, filed Jan. 30, 2024.

(Continued)

*Primary Examiner* — Kenneth N Vanderpuye
*Assistant Examiner* — Asif Shameem
(74) *Attorney, Agent, or Firm* — Meitar Patents LTD.; Daniel Kligler

(57) ABSTRACT

A transmitter includes a Local Oscillator (LO) circuit, multiple Radio Frequency (RF) combiners, and an optical transmitter. The LO circuit is configured to generate multiple LO signals having different LO frequencies. The Radio Frequency (RF) combiners are configured to receive multiple baseband signals and to respectively combine the baseband signals with the LO signals to produce combined baseband signals. The optical transmitter includes multiple optical sources, multiple modulators, and an optical multiplexer. The optical sources are configured to generate, when unmodulated, optical beams having a common wavelength. The modulators are configured to modulate the optical sources or the optical beams using the combined baseband signals, thereby generating multiple modulated optical signals having different wavelengths. The optical multiplexer is configured to optically combine the modulated optical signals to form a combined optical signal, and to transmit the combined optical signal over an optical fiber.

20 Claims, 8 Drawing Sheets

(56) References Cited

U.S. PATENT DOCUMENTS

| | | | |
|---|---|---|---|
| 7,522,842 | B1 | 4/2009 | McNicol et al. |
| 8,842,992 | B2 | 9/2014 | Middleton et al. |
| 8,909,057 | B2 * | 12/2014 | Sun .................... H04B 10/2575 398/115 |
| 9,071,195 | B2 | 6/2015 | Gabbay |
| 10,256,907 | B2 * | 4/2019 | Yu ...................... H04B 10/2513 |
| 2004/0198451 | A1 | 10/2004 | Varghese |
| 2004/0208614 | A1 | 10/2004 | Price |
| 2008/0005213 | A1 | 1/2008 | Holtzman |
| 2011/0097075 | A1 | 4/2011 | Tanimura et al. |
| 2011/0199127 | A1 | 8/2011 | Turner |
| 2012/0141135 | A1 | 6/2012 | Yang et al. |
| 2013/0259490 | A1 | 10/2013 | Malouin et al. |
| 2017/0346445 | A1 * | 11/2017 | Shen ..................... H04J 14/028 |
| 2018/0102849 | A1 | 4/2018 | Morton et al. |
| 2019/0089448 | A1 * | 3/2019 | Jakobsson ................. H04L 5/06 |

OTHER PUBLICATIONS

Notice of References Cited, U.S. Appl. No. 18/426,457, dated Mar. 18, 2026.

Notice of Allowance, U.S. Appl. No. 18/426,457, dated Mar. 18, 2026.

* cited by examiner

WAVELENGTH DIVISION MULTIPLEXING USING LIGHT SOURCES HAVING A COMMON WAVELENGTH

FIELD OF THE INVENTION

The present invention relates generally to RF transmission, and particularly to methods and systems for wavelength division multiplexing derived using a single wavelength in one or more light sources.

BACKGROUND OF THE INVENTION

Some modern communication technologies require long-distance transmission of signals. In various applications, baseband signals, e.g., Radio Frequency (RF) signals, may be transmitted via optical fibers with very low transmission loss. Communication links supporting the transmission of RF signals over optical fibers are collectively referred to as "RF over Fiber" (RFoF) links.

Multi-channel optical transmission may be used for increasing the capacity of an optical connection using Wavelength Division Multiplexing (WDM). Known state of the art multi-channel systems implement WDM by multiplexing several optical signals generated by optical sources having distinct stable wavelengths, or by using tunable optical sources.

SUMMARY OF THE INVENTION

An embodiment that is described herein provides a transmitter that includes a Local Oscillator (LO) circuit, multiple Radio Frequency (RF) combiners, and an optical transmitter. The LO circuit is configured to generate multiple LO signals having different LO frequencies. The RF combiners are configured to receive multiple baseband signals and to respectively combine the baseband signals with the LO signals to produce combined baseband signals. The optical transmitter includes multiple optical sources, multiple modulators, and an optical multiplexer. The optical sources are configured to generate, when unmodulated, optical beams having a common wavelength. The modulators are configured to modulate the optical sources or the optical beams using the combined baseband signals, thereby generating multiple modulated optical signals having different wavelengths. The optical multiplexer is configured to optically combine the modulated optical signals to form a combined optical signal, and to transmit the combined optical signal over an optical fiber.

In some embodiments, the optical multiplexer is configured to filter the multiple modulated optical signals using multiple respective optical filters having respective passbands, and the common wavelength of the optical sources and the LO frequencies generated by the LO circuit, are set to match the passbands of the optical multiplexer. In other embodiments, the modulators are direct modulators configured to directly modulate the respective optical sources, and a given optical source is configured, when modulated, to generate an optical beam (i) whose wavelength is offset by a corresponding LO frequency, and (ii) is modulated by a corresponding combined baseband signal. In yet other embodiments, the modulators are optical modulators connected between the optical sources and the optical multiplexer, the optical sources are configured to generate Continuous Wave (CW) optical signals having the common wavelength, and the modulators are configured to both (i) shift the common wavelength of the optical sources according to the respective LO frequencies, and (ii) modulate the CW optical signals responsively to the respective baseband signals.

In an embodiment, the LO circuit is configured to generate the LO signals by cyclically shifting predefined respective bit patterns. In another embodiment, the LO circuit is configured to cyclically shift the bit patterns using a clock signal whose frequency is tuned so that the LO signals respectively have the LO frequencies. In yet another embodiment, by cyclically shifting a given bit pattern, the LO circuit is configured to generate a dominant LO signal having a given LO frequency, plus one or more spurious signals, and the optical multiplexer is configured to pass the dominant LO signal and suppress at least some of the spurious signals.

In some embodiments, the optical multiplexer includes multiple input ports corresponding to respective optical passbands, and the optical transmitter is configured to optically combine two or more of the modulated optical signals generated by the modulators so as to form a multi-channel optical signal occupying one of the passbands, and to provide the multi-channel optical signal to a corresponding input port of the optical multiplexer.

There is additionally provided, in accordance with an embodiment that is described herein, a method for communication, including, generating multiple LO signals having different LO frequencies. Multiple baseband signals are received and are respectively combined with the LO signals to produce combined baseband signals. Optical beams having a common wavelength are generated by multiple optical sources, when unmodulated. The optical sources or the optical beams are modulated by multiple modulators, using the combined baseband signals, thereby generating multiple modulated optical signals having different wavelengths. The modulated optical signals are optically combined, using an optical multiplexer, to form a combined optical signal, and the combined optical signal is transmitted over an optical fiber.

There is additionally provided, in accordance with an embodiment that is described herein, a transmitter, including a Local Oscillator (LO) circuit and an optical transmitter. The LO circuit is configured to generate an LO signal comprising multiple LO signals having different LO frequencies. The optical transmitter includes an optical source, a modulator, a first optical multiplexer, multiple optical modulators and a second optical multiplexer. The optical source is configured to generate, when unmodulated, an optical beam having a given wavelength. The modulator is configured to modulate the optical source or the optical beam using the LO signal, thereby generating a modulated optical signal including multiple optical signals having different wavelengths. The first optical multiplexer is configured to extract the optical signals from the modulated optical signal. The optical modulators are configured to modulate the extracted optical signals with respective baseband signals to produce baseband modulated optical signals. The second optical multiplexer is configured to optically combine the baseband modulated optical signals to form a combined optical signal, and to transmit the combined optical signal over an optical fiber.

In some embodiments, the LO circuit is configured to generate the LO signal including the multiple LO signals by cyclically shifting a predefined bit pattern.

There is additionally provided, in accordance with an embodiment that is described herein, a method for communication, including generating an LO signal including multiple LO signals having different LO frequencies, and generating by an optical source, when unmodulated, an optical beam having a given wavelength. The optical source or the optical beam is modulated using the LO signal, thereby generating a modulated optical signal including multiple optical signals having different wavelengths. The optical signals are extracted from the modulated optical signal. The extracted optical signals are modulated with respective baseband signals to produce baseband modulated optical signals. The baseband modulated optical signals are optically combined to form a combined optical signal. The combined optical signal is transmitted over an optical fiber.

The present invention will be more fully understood from the following detailed description of the embodiments thereof, taken together with the drawings in which:

DETAILED DESCRIPTION OF EMBODIMENTS

Overview

Figure 1:
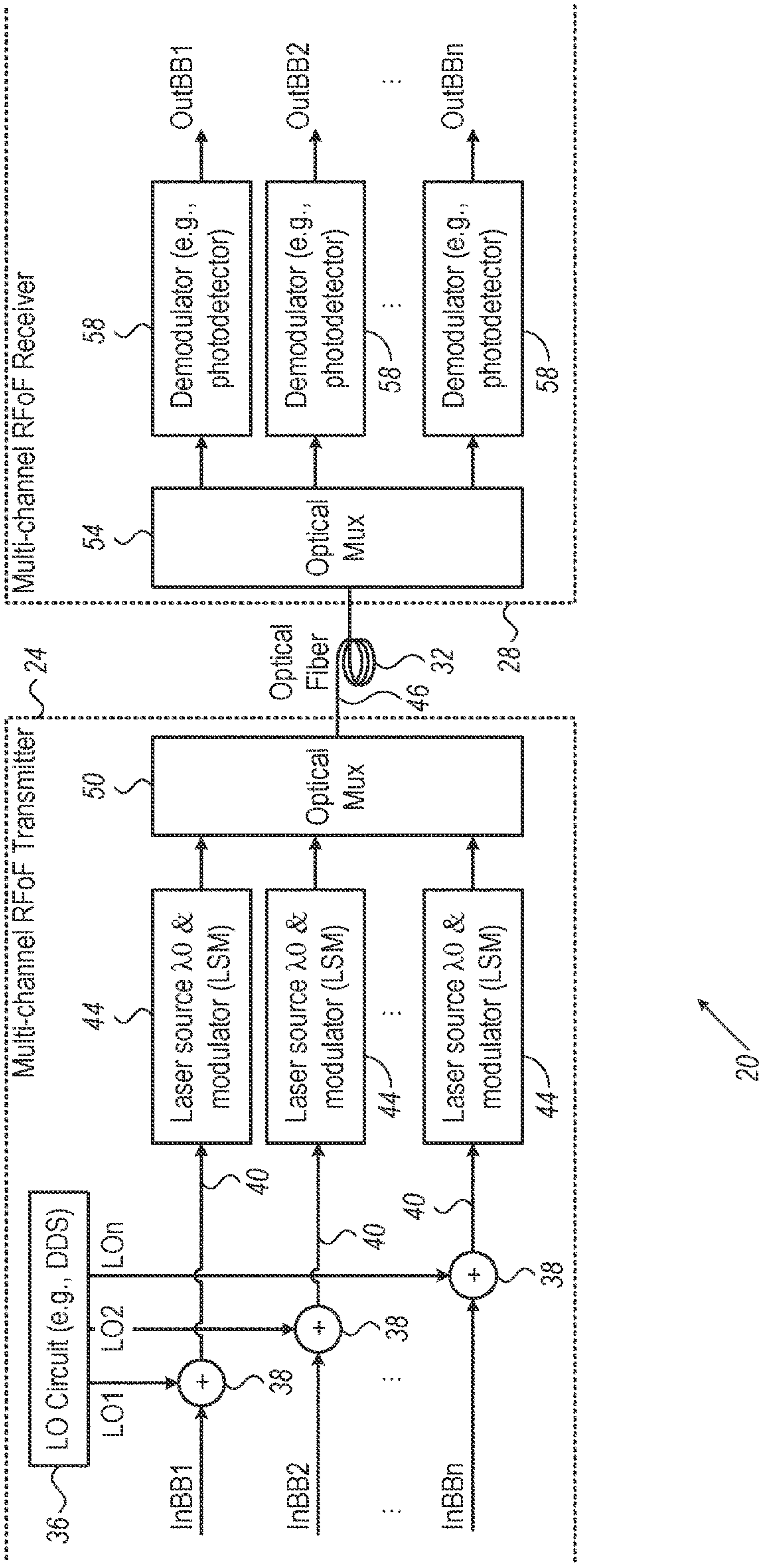
FIG. 1 is a block diagram that schematically illustrates a Wavelength Division Multiplexing (WDM) communication system in which multiple optical sources share a common wavelength, in accordance with an embodiment that is described herein.

Embodiments that are described herein provide methods, systems, and circuits for transmission of multiple baseband signals over the same optical fiber using (i) multiple optical sources sharing a common wavelength or (ii) a single optical source with a single wavelength.

The description that follows refers to multi-channel transmission of any type of baseband signals, such as, for example, baseband RF signals.

Various communication systems such as mobile systems and networks may transmit RF signals over long distances. For example, long-distance communication may be achieved using RFoF links. An RFoF link is typically built from an optical transmitter coupled to an optical receiver via an optical fiber. The transmitter typically includes a light source generating an optical beam of a desired wavelength, wherein the optical beam is modulated using the input baseband signal. The optical receiver typically comprises a photodetector that reconstructs the baseband signal. RFoF based communication is economical, incurs very low transmission loss and is less sensitive to noise and is impervious to electromagnetic interference compared to wireless and cable-based communication.

In some high throughput applications, a single optical fiber may be shared among multiple RFoF links, or by links that carry other baseband signals. For example, in Wavelength Division Multiplexing (WDM), multiple signals are carried by multiple optical beams having different respective wavelengths, thus forming a set of multiple parallel RFoF links multiplexed onto a single optical fiber.

In a conventional WDM system, multiple optical sources generate multiple optical beams having different respective wavelengths. The optical beams are modulated by the input signals and multiplexed optically to form a combined beam for transmission over the optical fiber. The different WDM wavelengths may be generated, for example, using an array of fixed-wavelength lasers having the different wavelengths, or by a bank of tunable lasers, having a large form factor and each requiring complex control circuits. In both the fixed and tunable laser source cases, the conventional WDM system is typically expensive, highly complex, and difficult to design and maintain.

In some disclosed embodiments, a novel WDM system uses multiple optical sources that when unmodulated generate optical beams having a common wavelength. Each of the optical beams is modulated using a combined baseband signal that combines one of the input signals and a corresponding Local Oscillator (LO) signal. In another disclosed WDM architecture, a single wavelength light source modulates a multi-carrier LO signal. The resulting optical signal is split into multiple optical signals having respective wavelengths. The optical signals are further modulated with baseband signals and combined optically for transmission over an optical fiber. The disclosed WDM architectures significantly reduce the size and cost compared to conventional WDM architectures supporting the same overall throughput.

Consider a transmitter that includes an LO circuit, multiple Radio Frequency (RF) combiners, and an optical transmitter. The LO circuit generates multiple LO signals having different LO frequencies. The RF combiners receive multiple baseband signals and respectively combine the baseband signals with the LO signals to produce combined baseband signals. The optical transmitter includes multiple optical sources, multiple modulators, and an optical multiplexer. The multiple optical sources generate, when unmodulated, optical beams having a common wavelength. The multiple modulators modulate the optical sources or the optical beams using the combined baseband signals, thereby generating multiple modulated optical signals having different wavelengths. The optical multiplexer optically combines the modulated optical signals to form a combined optical signal, and transmits the combined optical signal over an optical fiber.

In some embodiments, the optical multiplexer filters the multiple modulated optical signals using multiple respective optical filters having respective passbands. In these embodiments, the common wavelength of the optical sources, and the LO frequencies generated by the LO circuit, are set (by design) to match the passbands of the optical multiplexer.

The modulation of the optical beams may be carried out in various ways. For example, in one embodiment the modulators are direct modulators that directly modulate the respective optical sources. In this embodiment, a given optical source, when modulated, generates an optical beam (i) whose wavelength is offset by a corresponding LO frequency, and (ii) is modulated by a corresponding combined baseband signal. In another embodiment, the modulators are optical modulators connected between the optical sources and the optical multiplexer. In this embodiment, optical sources generate Continuous Wave (CW) optical signals having the common wavelength, and the modulators both (i) shift the common wavelength of the optical sources according to the respective LO frequencies, and (ii) modulate the shifted optical signals responsively to the respective baseband signals.

In some embodiments, the LO circuit generates the LO signals by cyclically shifting predefined respective bit patterns. In such embodiments, the LO circuit cyclically shifts the bit patterns using a clock signal whose frequency is tuned so that the LO signals respectively have the LO frequencies. In some embodiments, by cyclically shifting a given bit pattern, the LO circuit generates a dominant LO signal having a given LO frequency, plus one or more spurious signals, and the optical multiplexer passes the dominant LO signal and suppresses at least some of the spurious signals.

The optical multiplexer typically has multiple input ports corresponding to respective optical passbands. In some embodiments, the optical transmitter optically combines two or more of the modulated optical signals generated by the modulators so as to form a multi-channel optical signal occupying one of the passbands and provides the multi-channel optical signal to a corresponding input port of the optical multiplexer.

Consider an embodiment of another transmitter, comprising a Local Oscillator (LO) circuit and an optical transmitter. The LO circuit generates an LO signal comprising multiple LO signals having different LO frequencies. The optical transmitter includes an optical source, a modulator, a first optical multiplexer, multiple optical modulators, and a second optical multiplexer. The optical source generates, when unmodulated, an optical beam having a given wavelength. The modulator modulates the optical source or the optical beam using the LO signal, thereby generating a modulated optical signal comprising multiple optical signals having different wavelengths. The first optical multiplexer extracts the optical signals from the modulated optical signal. The multiple optical modulators modulate the extracted optical signals with respective baseband signals to produce baseband modulated optical signals. The second optical multiplexer optically combines the baseband modulated optical signals to form a combined optical signal, and transmits the combined optical signal over an optical fiber.

In the disclosed techniques, a transmitter in a WDM communication system comprises multiple optical sources whose optical beams, when unmodulated, have the same wavelength. Input baseband signals are combined with LO signals and used for modulating the optical beams. The modulated optical beams are optically combined for transmission over the optical fiber. The LO signals may be generated efficiently by cyclically shifting predefined bit patterns, which lowers power consumption and complexity compared to conventional LO generation circuits. In an alternative WDM transmitter, an optical source modulates a single wavelength optical source with a multi-carrier LO signal. The carrier signals are extracted, modulated with baseband signals, and recombined for transmission over the optical fiber. Using the disclosed embodiments significantly reduces the complexity, power consumption, and cost compared to conventional WDM based systems.

System Description

FIG. 1 is a block diagram that schematically illustrates a WDM communication system 20 in which multiple optical sources share a common wavelength, in accordance with an embodiment that is described herein.

Communication system 20 may be used for transporting baseband signals such as RF and microwave signals across long distance. The disclosed embodiments are applicable, for example, in the transmission of 5G/6G X-band and above mobile radio signals between a central location and remote base stations, in wideband satellite communication, and the like. The disclosed embodiments are also applicable, for example, in direction finding systems, which rely on precision phase tracking between multiple signals received by an interferometric antenna array, e.g., any type of multiple-input and multiple-output (MIMO) transmit antenna array for signal transport.

Communication system 20 comprises an RFoF transmitter 24 coupled to an RFoF receiver 28 via an optical fiber 32. RFoF transmitter 24 is also referred to herein as an a "WDM transmitter." In the present example, communication system 20 transports 'n' baseband signals concurrently, wherein n is an integer larger than 1. In some embodiments, communication system 20 supports n=32 or even n=64 baseband signals.

The RFoF transmitter comprises a Local Oscillator (LO) circuit 36 generating multiple LO signals denoted LO1 . . . LOn. In the present context, the term "LO signal" refers to a signal that can be used for shifting the frequency of another signal. For example, in the frequency domain, each of LO1 . . . LOn may contain a single spectral component or multiple spectral components.

In some embodiments, LO circuit 36 may comprise a Direct Digital Synthesizer (DDS). In one embodiment of this sort, the DDS generates the LO signals by cyclically shifting predefined bit patterns, using a Bit Pattern Digital Signal Synthesis (BPDS) circuit. An example BPDS circuit will be described below with reference to FIG. 2. Various aspects of BPDS circuits are described, for example, in a U.S. Pat. No. 9,071,195 (entitled "Method and system for signal synthesis"), whose disclosure is incorporated herein by reference.

RFoF transmitter 24 receives multiple baseband signals denoted InBB1 . . . InBBn. Wideband RF power combiners 38 combine (sum) the baseband signals with respective LO signals to produce multiple combined baseband signals 40.

The RFoF transmitter further comprises multiple Laser Source and Modulator (LSM) modules 44, each of which comprises an optical source and a modulator. In some disclosed embodiments, the optical sources are low-cost laser sources generating optical beams of a fixed common wavelength Δ0. The wavelengths of the different laser sources may deviate from the nominal wavelength Δ0 by up to a maximal wavelength difference specified, e.g., by the vendor.

The modulation functionality of LSMs 44 may be implemented using direct or indirect modulation methods. With direct modulation, the modulator is implemented using an electronic circuit (not shown) that electrically modulates the optical beam using the relevant combined baseband signal. With indirect modulation, the modulator is an optical modulator connected at the output of the optical source, and modulates the optical beam using the relevant combined baseband signal. The $i^{th}$ LSM module (e.g., $1 \le i \le n$) outputs a modulated optical signal whose wavelength (Δ0) is shifted depending on the $i^{th}$ LO signal, and modulated with the corresponding $i^{th}$ baseband signal.

It is noted that both terms "shift" and "modulation" relate to modulation operations. Modulation by the LO shifts the optical wavelength as does the modulation by the baseband. The difference in the terminology relates to the difference in frequency between the LO signal and the baseband signal.

RFoF transmitter 24 comprises an optical multiplexer 50, which has multiple input ports and an output port. The input ports are respectively coupled to the LSMs, and the output port is coupled to the optical fiber. The input ports are associated with respective optical passbands. In some embodiments, the passbands have a common optical width and share a common spacing between adjacent passbands. Alternatively, different optical widths and/or spacings can also be used. It is noted that the spacing between optical passbands can be specified in the optical domain (in terms of wavelengths) or equivalently in the frequency domain (in frequency units such as GHz). In the present context, optical bandwidth and spacing are specified in the optical domain, in frequency domain, or both.

Optical multiplexer 50 receives the modulated optical signals from the LSMs, filters the modulated optical signals based on the optical passbands, and combines the filtered modulated optical signals to form a combined optical signal 46 at the output port. The optical multiplexer transmits the combined optical signal over optical fiber 32.

In some embodiments, for a given common wavelength Δ0 of the LSMs, the frequencies of the LO signals LO1 . . . LOn are determined so that the $i^{th}$ modulated optical signal carrying the $i^{th}$ baseband signal InBBi falls within the passband of the $i^{th}$ input port (channel wavelength) of the multiplexer. For example, LO1 . . . LOn are determined so that the frequency spacing between the LO signals (in the frequency domain) are the same as (or close to) the spacing between corresponding optical passbands.

RFoF receiver 28 comprises an optical demultiplexer 54, which has an input port and multiple output ports. The optical demultiplexer may be the same element as the optical multiplexer but the signal flow through it is in the opposite direction. The optical demultiplexer receives combined optical signal 46 from the optical fiber and filters it using the same or similar passband optical filters as multiplexer 46, thus reconstructing the modulated optical signals that were generated in the RFoF transmitter by the LSM modules. Demodulators 58 demodulate the reconstructed modulated optical signals to produce output baseband signals OutBB1 . . . OutBBn reconstructing the respective input baseband signals inBB1 . . . inBB2. Demodulators 58 may be implemented, for example, using wideband photodetectors.

Example Implementation of a RFOF Transmitter

Figure 2:
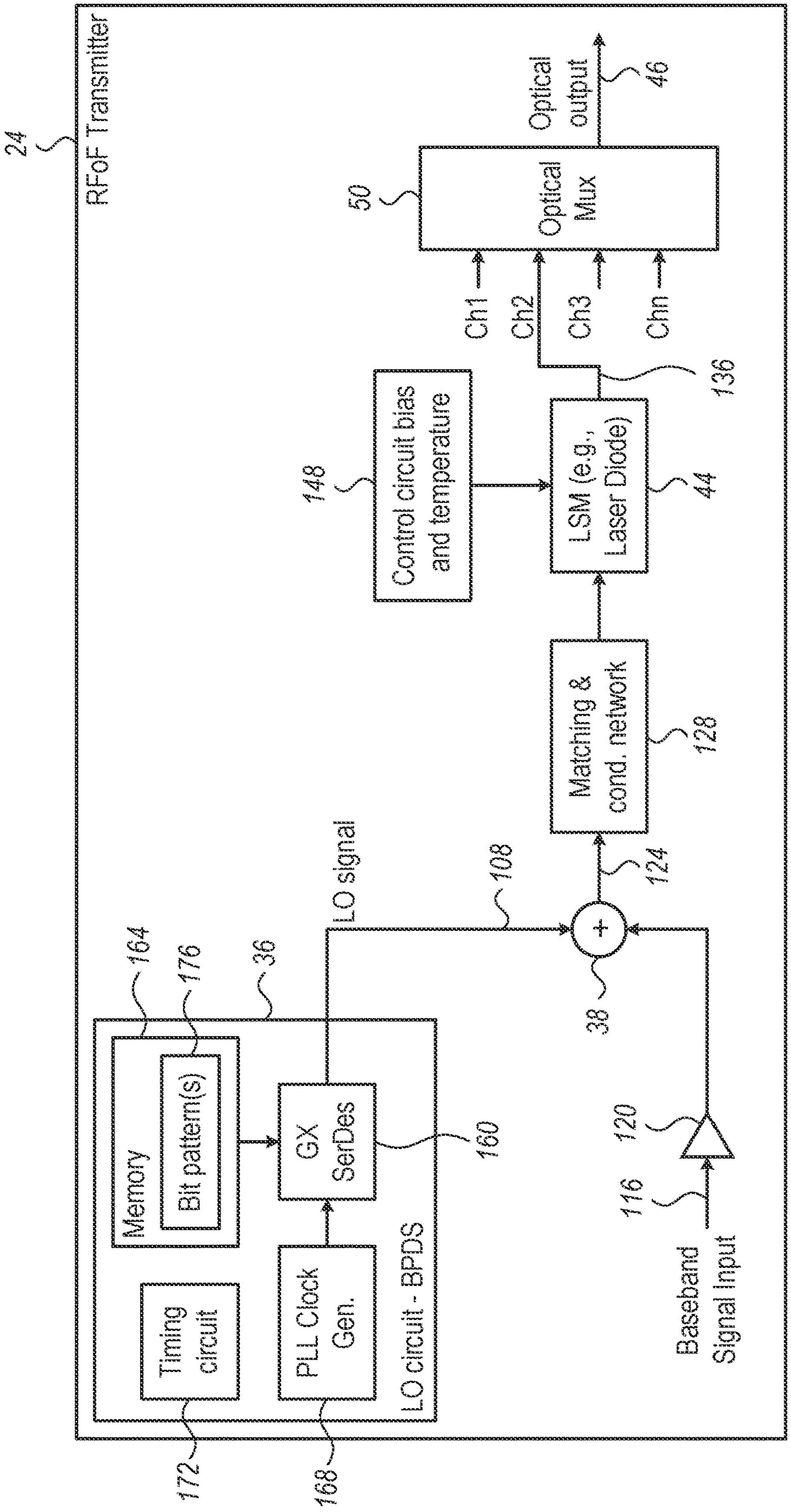
FIG. 2 is a block diagram that schematically illustrates a detailed implementation of the RFoF transmitter of the communication system of FIG. 1, in accordance with an embodiment that is described herein.

FIG. 2 is a block diagram that schematically illustrates a detailed implementation of the RFoF transmitter of the communication system of FIG. 1, in accordance with an embodiment that is described herein.

Although RFoF transmitter 24 of FIG. 2 supports multiple baseband signals, the figure depicts the details of only one channel, for the sake of clarity.

RFoF transmitter 24 comprises RF combiner 38 that combines between an LO signal 108 generated by LO circuit 36 with an input baseband signal 116 buffered using a buffer 120. The RF combiner outputs a combined baseband signal 124 containing both input baseband signal 116 and LO signal 108. Since the LO signal and the baseband signal are separated in the frequency domain, their spectral densities do not overlap at the combiner output.

The combined baseband signal is provided via a wideband matching and conditioning network 128 to LSM 44, which responsively to the combined baseband signal produces a modulated optical signal 136. In the present example, the laser source of the LSM may be modulated directly or indirectly, as explained above. Alternatively, any other suitable type of an LSM can also be used.

The optical multiplexer receives via its input ports respective modulated optical signals, including modulated optical signal 136 at input Ch2, optically filters the modulated optical signals in the respective passbands, combines the filtered optical signals to form a combined optical signal 46, and transmits the combined optical signal over the optical fiber (32). In the present example, LO signal 108 is designed so that modulated optical signal 136 contains a spectral component that carries the (buffered) baseband signal 116, and that falls within the passband associated with input Ch2 of the optical multiplexer. Similarly, other modulated optical channels are designed to have spectral components that fall in other respective passbands of the optical multiplexer.

A control circuit 148 controls the bias and temperature of the laser diode. For example, the control circuit monitors and controls the temperature of the laser diode using a suitable Thermoelectric Cooler (TEC).

In the present example, LO circuit 36 is implemented using a BPDS circuit comprising a Gigabit transceiver in the form of a Serializer/De-serializer (SerDes) 160. The BPDS circuit additionally comprises a memory 164, a clock generator 168, and a timing circuit 172. In the figure, the BPDS circuit is depicted with a single SerDes element generating one LO signal, for the sake of clarity. An extension to a multi-SerDes BPDS circuit is described further below.

Memory 164 stores a predefined bit sequence, also referred to as a "bit pattern" 176 (or stores multiple different bit patterns) having any suitable length, such as, for example, 128 bits. In general, different bit patterns correspond to different respective LO frequencies.

For generating an LO signal having a desired LO frequency (or multiple LO frequencies), the timing circuit loads SerDes 160 with a corresponding bit pattern from memory 164. The SerDes serializes the loaded bit pattern using a clock signal generated by clock generator 168. The SerDes cyclically serializes the bit pattern by outputting the bits of the loaded bit pattern sequentially using the clock signal. In addition, the serial output of the SerDes is connected to its serial input such that the SerDes continuously outputs the bit pattern in a cyclical repetition.

The frequency of the serializing clock signal determines the bit rate at the output of the SerDes (and therefore also the target LO frequency). This bit rate may be set, for example, to 28.0 Gbps, or to any other suitable bit rate value. In an embodiment, the SerDes is configured to operate in a direct PHY coding mode so that the loaded bit pattern is serialized without being subjected to any coding or other modifications.

In some embodiments, the timing circuit shifts the bit pattern loaded to the SerDes to corresponding points in the bit pattern, at specified instances, e.g., to apply phase modulation to the LO signal (in the digital domain) and therefore also to the corresponding baseband signal.

In some embodiments, clock generator 168 comprises a Phase Locked Loop (PLL) circuit, which is locked on a reference clock signal generated locally, e.g., by a crystal oscillator.

For generating multiple LO signals, the LO circuit comprises multiple SerDes elements, which are loaded with different respective bit patterns. The clock signal generated by clock generator 168 is shared by the multiple SerDes elements so that the bits output by the multiple SerDes elements are synchronized with one another.

Some commercial FPGA devices have built-in SerDes elements. In some embodiments, BPDS circuit 36 may be implemented efficiently in a FPGA of this sort by utilizing the built-in SerDes elements.

The BPDS based LO circuit 36 of FIG. 2 is given by way of example, and other suitable BPDS based or PLL based LO circuits can also be used.

Figure 3:
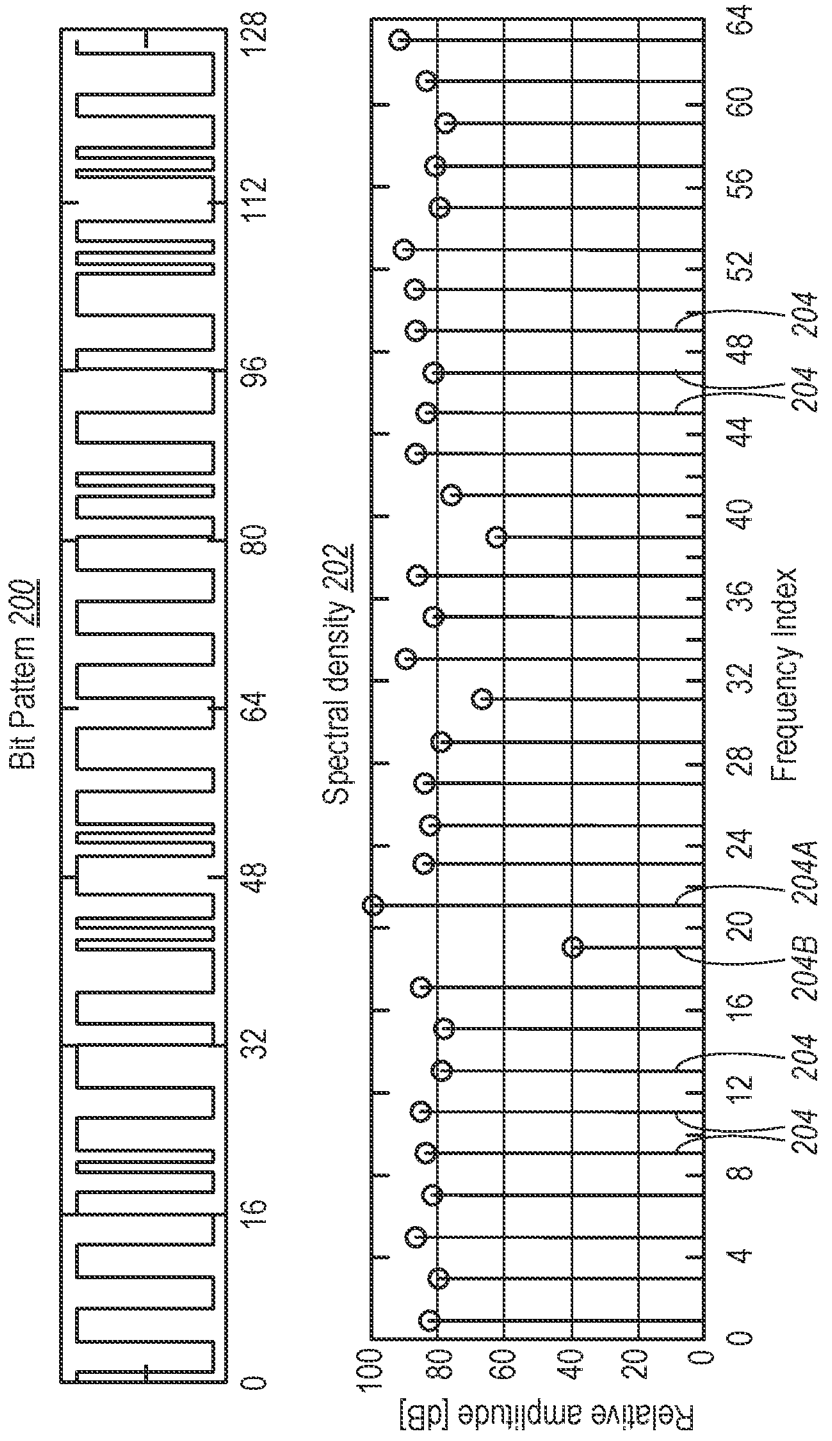
FIG. 3 is a diagram that schematically illustrates a bit pattern and a corresponding spectral density resulting by cyclically serializing the bit pattern for generating a Local Oscillator (LO) signal, in accordance with an embodiment that is described herein.

FIG. 3 is a diagram that schematically illustrates a bit pattern 200 and a spectral density 202 resulting by cyclically serializing the bit pattern for generating an LO signal, in accordance with an embodiment that is described herein.

Bit pattern 200 may be used, for example, within BPDS circuit 36 of FIG. 2 above. In the present example, bit pattern 200 contains 128 bits. Alternatively, bit patterns of other suitable lengths can also be used.

As depicted in FIG. 3, spectral density 202 contains multiple spectral lines, including a dominant spectral line 204A corresponding to a desired LO frequency, and spurious lines 204 and 204B having lower amplitudes compared to the dominant spectral line. In the present context the term "dominant spectral line" means a spectral line having the highest amplitude in a relevant frequency range. In the figure, relative amplitudes of the spectral lines are given in decibel (dB units). It is noted that spurious line 204B, which is closest to spectral line 204A from below, is attenuated by 60 dB relative to spectral line 204A.

For bit pattern 200 (and for other selected bit patterns), the resulting spectral lines correspond to odd-valued frequency indices, while no spectral lines are created for even-valued frequency indices.

The structure of the spectral density depends on the underlying bit pattern but not on the serializing clock frequency of the SerDes. The frequency spaces between adjacent spectral lines are determined using a parameter denoted "Fstep", which is defined as the SerDes clock frequency divided by the number of bits in the bit patterns. The actual frequencies corresponding to the spectral lines are given by multiples of the Fstep parameter. Therefore, doubling (for example) the SerDes clock frequency has the effect of doubling the frequencies associated with the spectral lines.

In the present example, dominant spectral line 204A corresponds to a frequency index 21, which results in an LO frequency of 21. Fstep. For example, using a 64 GHz serializing clock frequency, Fstep is given by 64 GHz/128=0.5 GHz, and the resulting LO frequency is given by (21·0.5 GHz)=10.5 GHZ.

In some embodiments, the frequency of the serializing clock of the SerDes elements is selected so that the dominant spectral lines of different bit patterns fall within respective passbands of the optical multiplexer being used.

In some embodiments, the same spectral density can be achieved by replicating each bit in the bit pattern k times, and using a serialization bit rate that is k times higher than the original bit rate. In such embodiments, the phase resolution in applying phase modulation or phase shifts improves by a factor of k.

In some embodiments, BPDS circuit 36 applies a Band Pass Filter (BPF) (not shown) to the signal output by the SerDes, to filter out the spurious spectral lines. Since the amplitudes of the even indexed spectral components are null, the bandwidth of the BPF that passes the dominant spectral line and suppresses the spurious spectral lines may be implemented using a low complexity filter. It is noted that using such a BPF is not mandatory because the optical multiplexer blocks or suppresses the spurious spectral lines falling outside each of its passbands.

The bit pattern and spectral density in FIG. 3 are given by way of example, and other suitable bit patterns and spectral densities can also be used. For example, in alternative embodiments, other bit patterns for generating other LO frequencies can also be used. For example, another bit pattern may result in a spectral density having a dominant spectral line at a frequency index 19, which with a 64 GHz serializing clock results in a dominant spectral line of (19.0.5 Hz) 9.5 GHz.

Although with the bit patterns above a highly attenuated spurious signal appears at a frequency below that of the dominant spectral line, this is not mandatory. In alternative embodiments, bit patterns for which a highly attenuated spurious spectral line appears at a frequency above the dominant spectral line can also be used.

Figure 4:
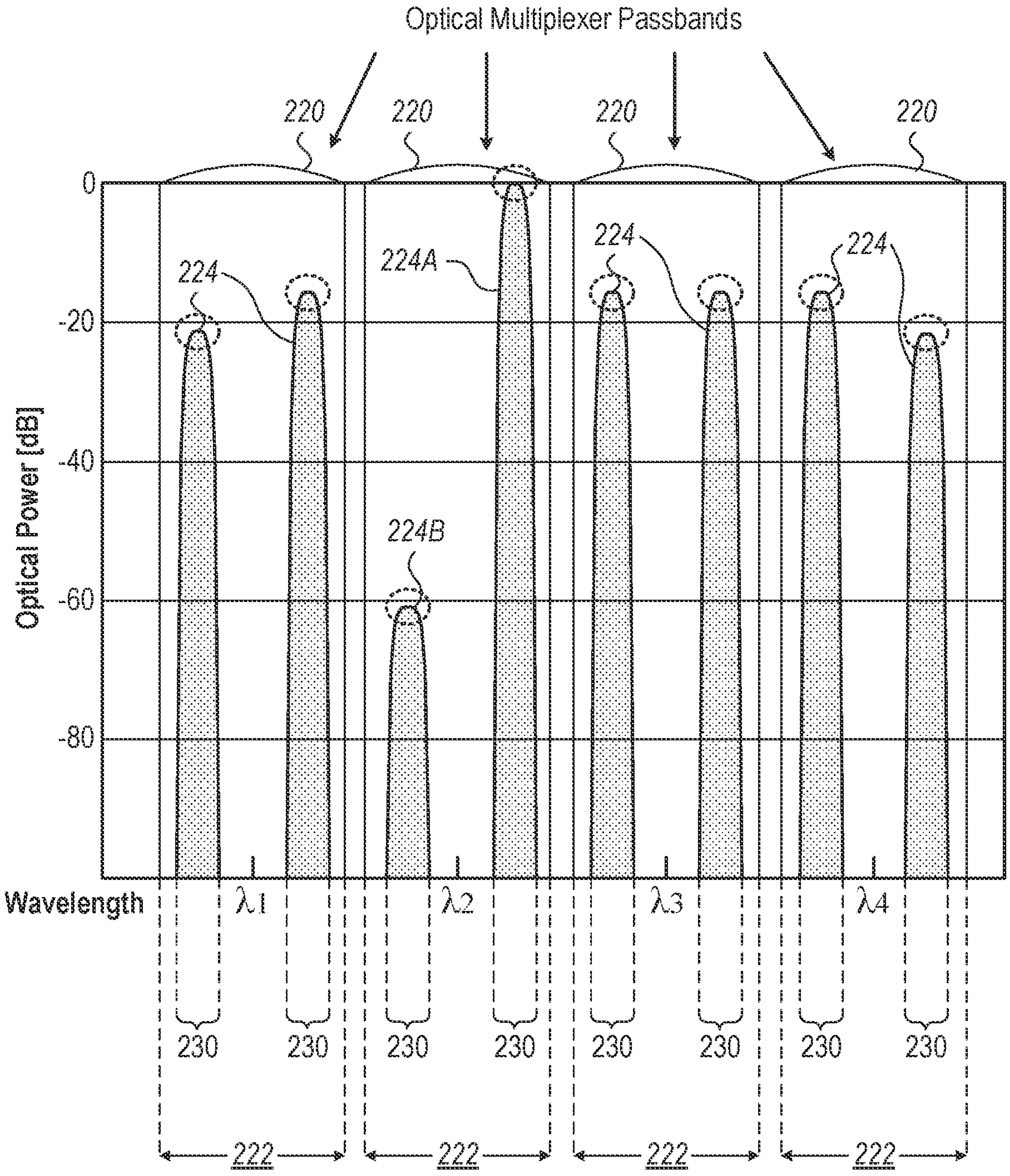
FIG. 4 is a diagram that schematically illustrates an optical domain spectral density of a modulated optical signal, corresponding to the bit pattern of FIG. 3, in accordance with an embodiment that is described herein.

FIG. 4 is a diagram that schematically illustrates an optical domain spectral density of a modulated optical signal, corresponding to bit pattern 200 of FIG. 3, in accordance with an embodiment that is described herein.

In describing FIG. 4, it is assumed that the modulated optical signal (136) is generated in RFoF transmitter 24 of FIG. 2.

In the example of FIG. 4, optical multiplexer 50 has four input ports associated with four optical passbands 220, which are centered about respective wavelengths denoted Δ1 . . . Δ4. The optical passbands may have any suitable optical bandwidth 222 such as, for example, 50 GHz or 100 GHz width.

In the present example, the spectral lines in FIG. 4 are all modulated by the baseband signals of the same bandwidth, and whose bandwidth 230 is narrower than optical bandwidth 222 of the optical passbands.

In this example, both the modulated dominant spectral line 224A and the modulated −60 dB spurious signal 224B fall within the passband of the second input port (Ch2) of the optical multiplexer, whereas other modulated spurious spectral lines 224 fall in other passbands of the optical multiplexer. Consequently, in practice, substantially only the modulated dominant spectral line is combined (multiplexed) with modulated dominant spectral lines of other input ports to form combined optical signal 46.

The modulated optical signal of FIG. 4 is given by way of example, and other modulated optical signals can also be used. For example, a different modulated optical signal can be generated using a bit pattern different from bit pattern 200. As another example, a different serializing clock can be used for generating a different spacing among the modulated spectral lines compared to the spacing in FIG. 4. For example, the serializing frequency of the SerDes elements can be determined so that only one spectral line (e.g., a dominant spectral line, if any) falls within each passband of the optical multiplexer.

Combining Multiple Sub-Channels into One Optical Channel

In some embodiments, two or more optical sub-channels carrying different respective baseband signals can be optically combined for transmission via a common passband of the optical multiplexer. With such a scheme, the number of baseband channels supported can be increased without changing the bandwidths of optical passbands and the spacing between them. For example, by combining two sub-channels having the same bandwidth into the same optical passband, the throughput of the corresponding optical link can be doubled.

Figure 5:
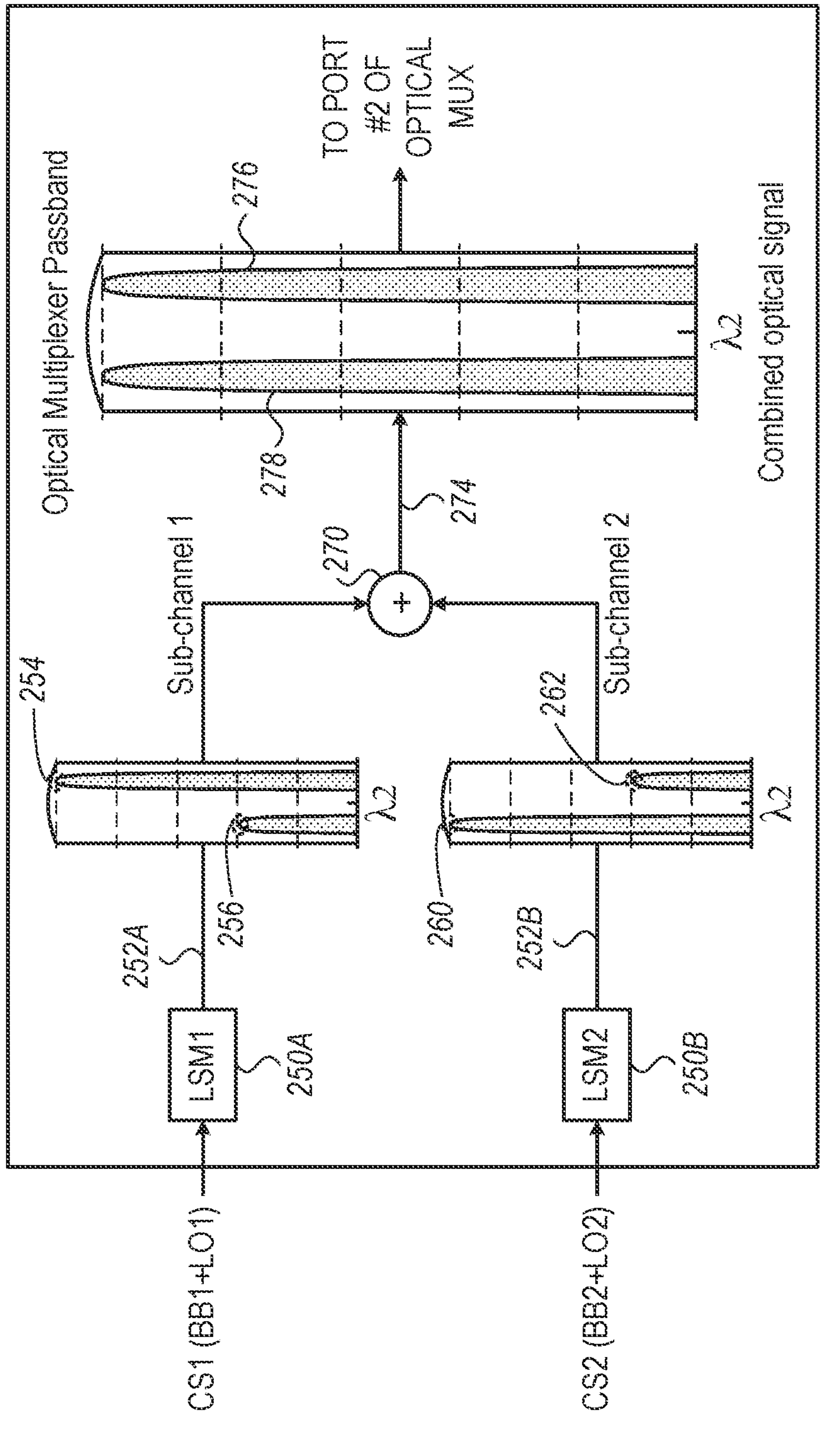
FIG. 5 is a diagram that schematically illustrates a scheme for combining two sub-channels into a common passband of an optical multiplexer, in accordance with an embodiment that is described herein.

FIG. 5 is a diagram that schematically illustrates a scheme for combining two sub-channels into a common passband of an optical multiplexer, in accordance with an embodiment that is described herein.

In FIG. 5, LSM 250A (denoted LSM1) receives a combined baseband signal denoted CS1, and LSM 250B receives a combined baseband signal denoted CS2. The CS1 signal contains a baseband signal denoted BB1 combined with an LO signal denoted LO1. Similarly, the CS2 signal contains a baseband signal denoted BB2 combined with an LO signal denoted LO2. In the present example, the LO1 and LO2 signals are generated by a common BPDS circuit (such as BPDS circuit 36 of FIG. 2) using different respective bit patterns. The LO1 and LO2 signals are generated by respective SerDes elements using the same serializing frequency. In this example, the serializing frequency is determined so that the frequency spacing between the sub-channels is about half the optical bandwidth of the optical multiplexer passbands.

In the present example, the modulated optical signal 252A output by LSM1 contains spectral lines 254 and 256 modulated using the BB1 signal. Similarly, both modulated optical signal 252B output by LSM2 contains spectral lines 260 and 262, both modulated using the BB2 signal.

The modulated spectral lines 254 and 256 corresponding to LSM1 and the modulated spectral lines 260 and 262 corresponding to LSM2 fall within the same passband (centered about wavelength λ2) of the optical multiplexer. In the present example, spectral lines 254 and 260 are the dominant modulated spectral lines and spectral lines 256 and 262 are −60 dB modulated spurious lines.

In the scheme of FIG. 5, an optical combiner 270 combines the modulated optical signals 252A and 252B to form a sub-channel combined optical signal 274, which is provided, in the present example, to the second port of the optical multiplexer. Due to the −60 dB attenuation of the spurious signals, the combined optical signal 274 substantially contains modulated spectral lines 276 and 278, which are essentially equal to (or highly resemble) the dominant modulated spectral lines 254 and 260, respectively.

The combined optical signal 274 is typically further combined using the optical multiplexer with other optical signals for transmission to a receiver (not shown) over an optical fiber.

On the receiver side (not shown), an optical demultiplexer separates between the optical signals of the different passbands, and the separated optical signals are demodulated, e.g., using respective photodetectors. In the present example, the two sub-channels carried in a demodulated signal are further separated using, for example, a suitable RF diplexer and/or two heterodyne receivers so as to reconstruct the baseband signals BB1 and BB2.

The scheme of FIG. 5 is given by way of example, and other suitable schemes can also be used. For example, in an alternative embodiment, more than two sub-channels may be combined into the same passband of the optical multiplexer. In an example embodiment, three baseband signals of three respective sub-channels are combined into the same passband, and the receiver applies a triplexer and three heterodyne receivers to reconstruct the three baseband signals of the sub-channels.

A Method for Multi-Channel Transmission

Figure 6:
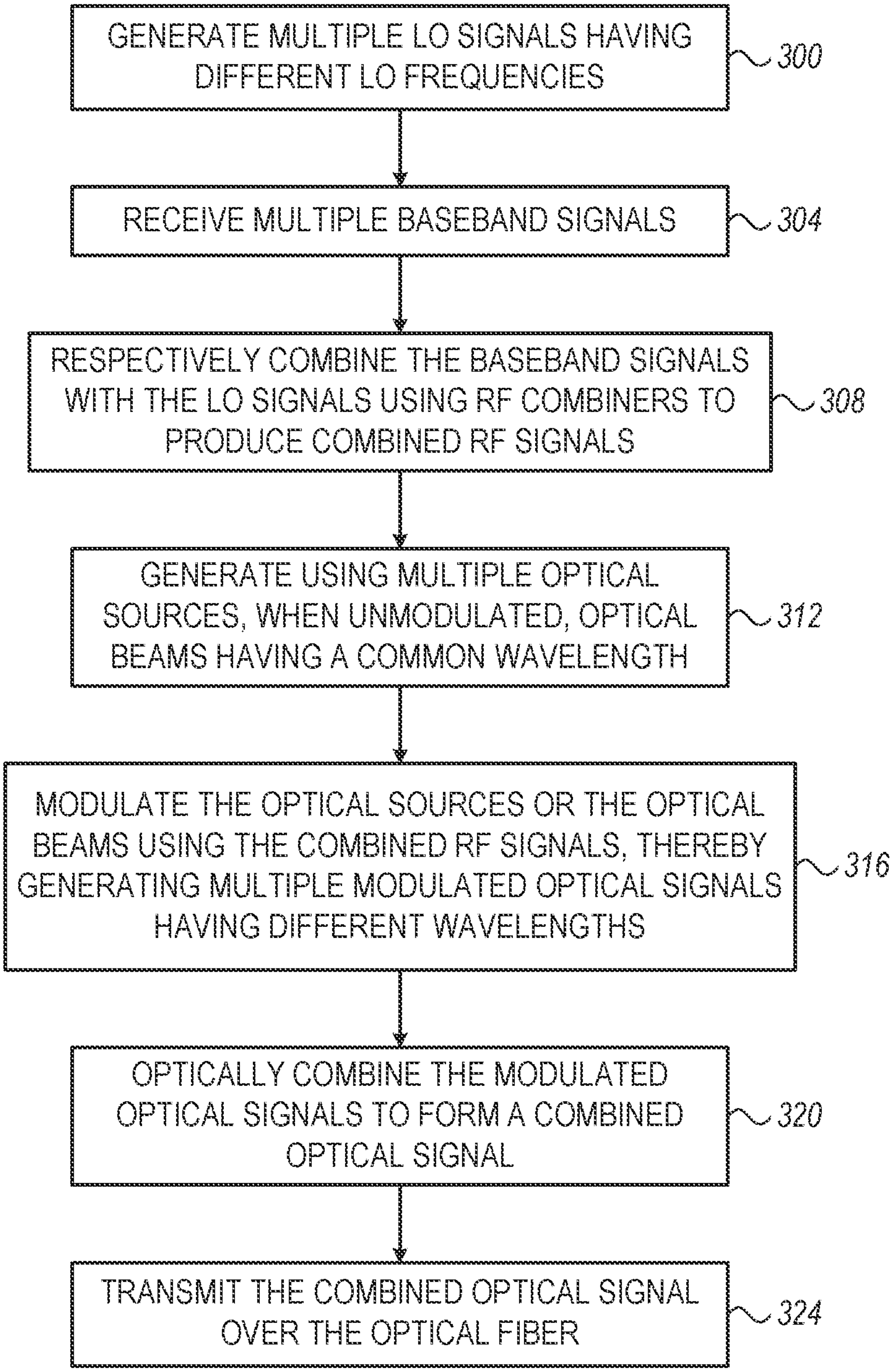
FIG. 6 is a flow chart that schematically illustrates a method for multi-channel transmission in a WDM communication system, in accordance with an embodiment that is described herein.

FIG. 6 is a flow chart that schematically illustrates for multi-channel transmission in a WDM a method communication system, in accordance with an embodiment that is described herein.

The method will be described as executed by RFoF transmitter 24 of FIG. 1.

The method begins with LO circuit 36 generating multiple LO signals having different LO frequencies at an LO generation step 300. At a baseband reception step 304, the RFoF transmitter receives multiple baseband signals, each of which carrying data of a dedicated channel. The baseband signals may comprise RF baseband signals, or any other suitable baseband signals.

At a combining step 308, combiners 38 respectively combine the baseband signals with the lo signals to produce combined baseband signals. At an optical beam generation step 312, the RFoF transmitter generates using multiple optical sources, when unmodulated, optical beams having a common wavelength. At a modulation step 316, the RFoF transmitter modulates the optical sources (direct modulation) or the optical beams (indirect modulation) using the combined baseband signals, thereby generating multiple modulated optical signals having different wavelengths.

At an optical combining step 320, optical multiplexer 50 optically combines the modulated optical signals to form a combined optical signal. At a transmission step 324 the RFoF transmitter transmits the combined optical signal over the optical fiber, and the method terminates.

A WDM Transmitter Architecture Based on a Single Wavelength Optical Source

Figure 7:
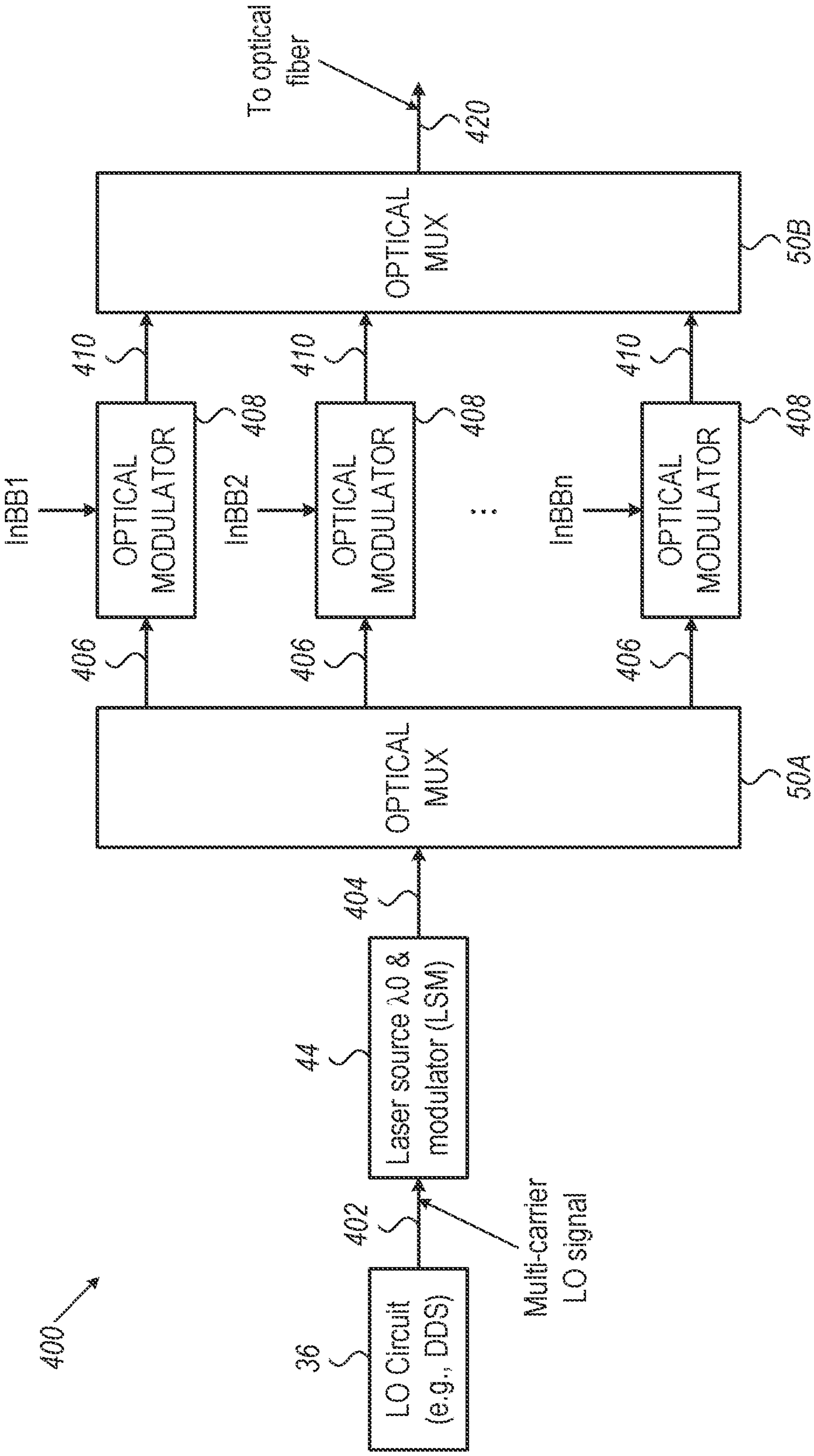
FIG. 7 is a block diagram that schematically illustrates a WDM transmitter based on a single wavelength optical source, in accordance with an embodiment that is described herein.

FIG. 7 is a block diagram that schematically illustrates a WDM transmitter 400 based on a single wavelength optical source, in accordance with an embodiment that is described herein. WDM transmitter 400 of FIG. 7 may be used in a suitable WDM communication system instead of WDM transmitter 24 of FIG. 1.

WDM transmitter 400 comprises LO circuit 36 that generates an LO signal 402 comprising multiple LO signals having respective LO frequencies. In some embodiments, the LO frequencies are equally spaced to match respective passbands of multiplexers, optical as described hereinbelow. LO circuit 36 may generate the LO signals using any suitable method. For example, the LO circuit may comprise a DDS that generates a comb of the LO frequencies by cyclically serializing a predefined bit pattern. Unlike the LO circuit in the system of FIG. 1, in which a bit pattern we selected so that the amplitude of one of the LO signals was dominant over the others, in the embodiment of FIG. 7 the bit pattern is selected so that the multiple LO signals have substantially similar amplitudes (e.g., within a predefined amplitude range).

WDM transmitter 400 comprises Laser Source and Modulator (LSM) 44 that comprises an optical source and a modulator. The laser source generates an optical beam of a fixed wavelength Δ0. The modulation functionality of LSM 44 may be implemented using direct or indirect modulation methods. With direct modulation, the modulator is implemented using an electronic circuit (not shown) that electrically modulates the optical beam using the multi-carrier LO signal. With indirect modulation, the modulator is an optical modulator connected at the output of the optical source, and modulates the optical beam using the multi-carrier LO signal. The LSM outputs a modulated optical signal 404 that comprises multiple LO signals having respective (e.g., equally spaced) wavelengths.

An optical multiplexer 50A (operating as an optical demultiplexer) extracts the individual optical LO signals 406 from the modulated optical signal 404.

WDM transmitter 400 further comprises multiple optical modulators 408, associated with respective baseband signals denoted InBB1 . . . InBBn. The optical modulators modulate the LO signals 406 extracted by optical multiplexer 50A with respective BB signals to produce multiple modulated optical signals 410 (carrying the BB signals). Another optical multiplexer 50B combines the baseband modulated optical signals 410 to form a combined optical signal 420. WDM transmitter 400 transmits combined optical signal 420 over an optical fiber (e.g., 32).

In some embodiments, optical multiplexers 50A and 50B are instances of the same optical multiplexer, having the same optical passbands. The LO frequencies of the LO signals (comprised in the LO signal generated by LO circuit 36), and the wavelength Δ0 of the laser source of LSM 44, are set so that the wavelengths of the optical signals of the modulated optical signal fall within respective passbands of the optical multiplexers 50A and 50B.

Figure 8:
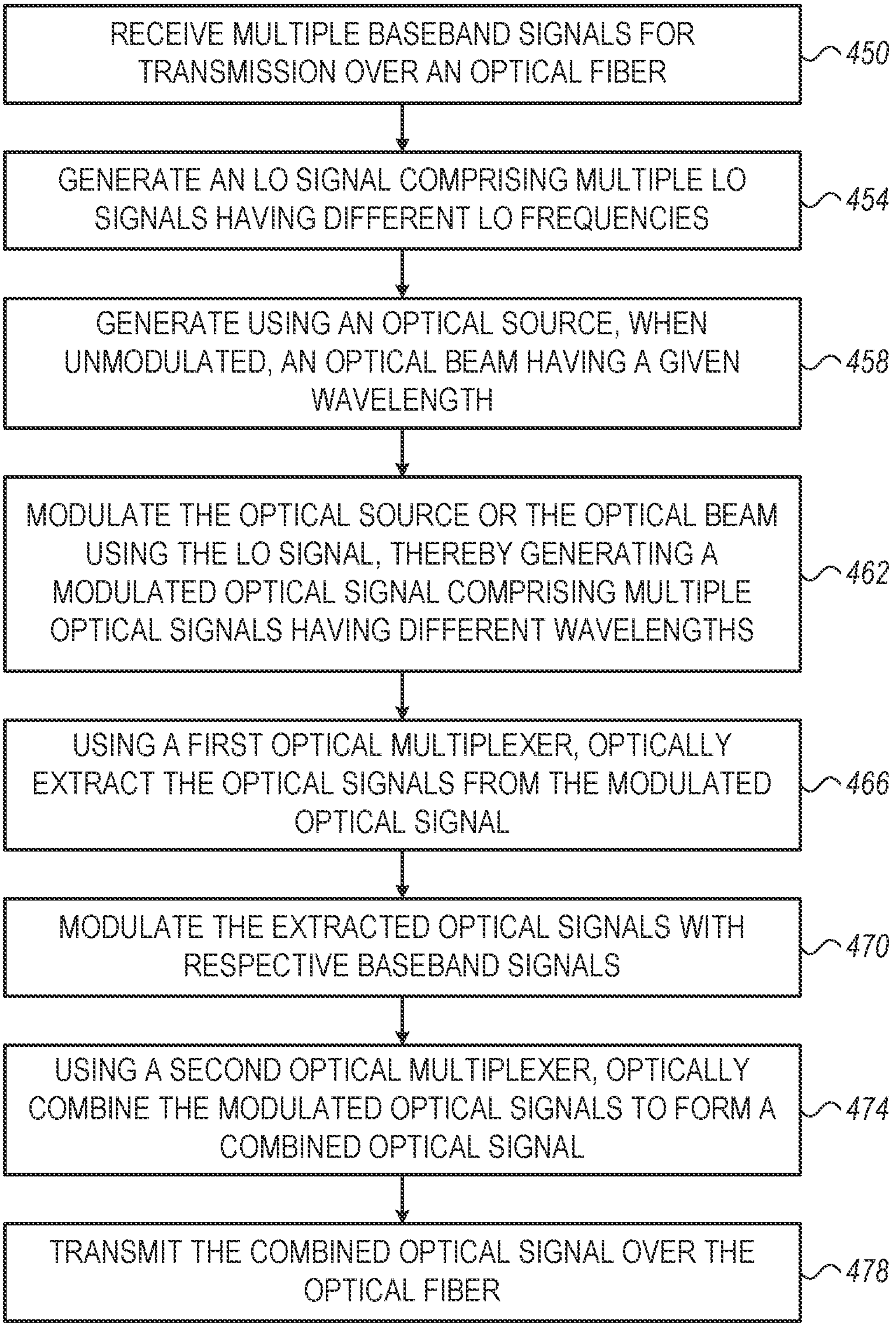
FIG. 8 is a flow chart that schematically illustrates a method for WDM transmission using a single wavelength optical source, in accordance with an embodiment that is described herein.

FIG. 8 is a flow chart that schematically illustrates a method for WDM transmission using a single wavelength optical source, in accordance with an embodiment that is described herein.

The method will be described as executed by elements of WDM transmitter 400 of FIG. 7 above.

The method begins at a reception step 450, with transmitter 400 receiving multiple baseband signals (InBB1 . . . InBBn) for transmission over an optical fiber.

At an LO generation step 454, LO circuit 36 generates an LO signal (402) comprising multiple LO signals having different LO frequencies. At a beam generation step 458, the optical source (e.g., a laser diode) of LSM 44 generates, when unmodulated, an optical beam having a given wavelength. At an optical modulation step 462, LSM 44 modulates the optical source or the optical beam using the LO signal (402), thereby generating a modulated optical signal (404) comprising multiple optical signals having different wavelengths.

At a first multiplexing step 466, optical multiplexer 50A extracts the optical signals (406) from the modulated optical signal (404) by respectively filtering the modulated optical signal in accordance with the passbands of multiplexer 50A. At a baseband modulation step 470, optical modulators 408 modulate the extracted optical signals (406) with respective baseband signals to produce baseband modulated optical signals (410). At a second multiplexing step 474, optical multiplexer 50B optically combines the baseband modulated optical signals (410) to form a combined optical signal (420). At a transmission step 478 optical multiplexer 50B transmits the combined optical signal over the optical fiber. Following step 478 the method terminates.

The configurations of communication system 20 of FIG. 1, RFoF transmitter of FIG. 2, WDM transmitter 400 of FIG. 7, and the sub-channel combining scheme of FIG. 5, are example configurations, which are chosen purely for the sake of conceptual clarity. In alternative embodiments, other suitable communication system, RFoF transmitter, WDM transmitter and sub-channel combining scheme configurations can also be used.

Elements that are not necessary for understanding the principles of the present invention, such as various interfaces, amplifiers, addressing circuits, timing and sequencing circuits and debugging circuits, have been omitted from the figures for clarity.

Some elements of communication system 20, RFoF transmitter 24, WDM transmitter 400, sub-channel combining scheme of FIG. 5, LO circuit 36 of FIGS. 1, 2 and 7 implemented using a BPDS circuit, may be implemented in hardware, e.g., in one or more Application-Specific Integrated Circuits (ASICs) or FPGAs. Additionally, or alternatively, control circuit 136 can be implemented using software, or using a combination of hardware and software elements.

In some embodiments, some of the functions of control circuit 136 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Memory 164 of BPDS circuit 36 of FIG. 2 may comprise any suitable type of memory such as a Read Only Memory (ROM), Random Access Memory (RAM) or a Nonvolatile memory such as a Flash memory.

The embodiments described above are given by way of example, and other suitable embodiments can also be used. For example, although BPDS circuit of FIG. 2 generates multiple LO signals, in alternative embodiments, at least two of the LO signals may be generated by separate BPDS circuits.

Although the embodiments described herein mainly address the transport of RF and other baseband signals, the methods and systems described herein can also be used in other applications, such as the transport of digital baseband signals.

It should be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A transmitter, comprising:

a Local Oscillator (LO) circuit, configured to generate multiple LO signals having different LO frequencies;

multiple Radio Frequency (RF) combiners, configured to receive multiple baseband signals and to respectively combine the baseband signals with the LO signals to produce combined baseband signals; and an optical transmitter, comprising:

multiple optical sources, configured to generate, when unmodulated, optical beams having a common wavelength;

multiple modulators, configured to modulate the optical sources or the optical beams using the combined baseband signals, thereby generating multiple modulated optical signals having different wavelengths; and an optical multiplexer, configured to optically combine the modulated optical signals to form a combined optical signal, and to transmit the combined optical signal over an optical fiber.

2. The transmitter according to claim 1, wherein:

the optical multiplexer is configured to filter the multiple modulated optical signals using multiple respective optical filters having respective passbands; and the common wavelength of the optical sources, and the LO frequencies generated by the LO circuit, are set to match the passbands of the optical multiplexer.

3. The transmitter according to claim 1, wherein the modulators are direct modulators configured to directly modulate the respective optical sources, and wherein a given optical source is configured, when modulated, to generate an optical beam (i) whose wavelength is offset by a corresponding LO frequency, and (ii) is modulated by a corresponding combined baseband signal.

4. The transmitter according to claim 1, wherein the modulators are optical modulators connected between the optical sources and the optical multiplexer, wherein the optical sources are configured to generate Continuous Wave (CW) optical signals having the common wavelength, and wherein the modulators are configured to both (i) shift the common wavelength of the optical sources according to the respective LO frequencies, and (ii) modulate the CW optical signals responsively to the respective baseband signals.

5. The transmitter according to claim 1, wherein the LO circuit is configured to generate the LO signals by cyclically shifting predefined respective bit patterns.

6. The transmitter according to claim 5, wherein the LO circuit is configured to cyclically shift the bit patterns using a clock signal whose frequency is tuned so that the LO signals respectively have the LO frequencies.

7. The transmitter according to claim 5, wherein by cyclically shifting a given bit pattern, the LO circuit is configured to generate a dominant LO signal having a given LO frequency, plus one or more spurious signals, and wherein the optical multiplexer is configured to pass the dominant LO signal and suppress at least some of the spurious signals.

8. The transmitter according to claim 1, wherein the optical multiplexer comprises multiple input ports corresponding to respective optical passbands, and wherein the optical transmitter is configured to optically combine two or more of the modulated optical signals generated by the modulators so as to form a multi-channel optical signal occupying one of the passbands, and to provide the multi-channel optical signal to a corresponding input port of the optical multiplexer.

9. A method for communication, comprising:

generating multiple LO signals having different LO frequencies;

receiving multiple baseband signals and respectively combining the baseband signals with the LO signals to produce combined baseband signals;

generating multiple optical sources, when unmodulated, optical beams having a common wavelength;

modulating the optical sources or the optical beams, by multiple modulators, using the combined baseband signals, thereby generating multiple modulated optical signals having different wavelengths; and optically combining the modulated optical signals, using an optical multiplexer, to form a combined optical signal, and transmitting the combined optical signal over an optical fiber.

10. The method according to claim 9, and comprising, filtering, by the optical multiplexer, the multiple modulated optical signals using multiple respective optical filters having respective passbands, and setting the common wavelength of the optical sources, and the LO frequencies to match the passbands of the optical multiplexer.

11. The method according to claim 9, wherein the modulators are direct modulators, which directly modulating the respective optical sources, and comprising, generating by a given optical source, when modulated, an optical beam (i) whose wavelength is offset by a corresponding LO frequency, and (ii) is modulated by a corresponding combined baseband signal.

12. The method according to claim 9, wherein the modulators are optical modulators connected between the optical sources and the optical multiplexer, and comprising generating by the optical sources Continuous Wave (CW) optical signals having the common wavelength, and performing by the modulators (i) shifting the common wavelength of the optical sources according to the respective LO frequencies, and (ii) modulating the CW optical signals responsively to the respective baseband signals.

13. The method according to claim 9, wherein generating the LO signals comprises generating the LO signals by cyclically shifting predefined respective bit patterns.

14. The method according to claim 13, wherein cyclically shifting the bit patterns comprises cyclically shifting the bit patterns using a clock signal whose frequency is tuned so that the LO signals respectively have the LO frequencies.

15. The method according to claim 13, wherein generating the LO signals comprises generating, by cyclically shifting a given bit pattern, a dominant LO signal having a given LO frequency, plus one or more spurious signals, and passing the dominant LO signal and suppressing at least some of the spurious signals, by the optical multiplexer.

16. The method according to claim 9, wherein the optical multiplexer comprises multiple input ports corresponding to respective optical passbands, and comprising, optically combining two or more of the modulated optical signals generated by the modulators so as to form a multi-channel optical signal occupying one of the passbands, and providing the multi-channel optical signal to a corresponding input port of the optical multiplexer.

17. A transmitter, comprising:

a Local Oscillator (LO) circuit, configured to generate an LO signal comprising multiple LO signals having different LO frequencies; and an optical transmitter, comprising:

an optical source, configured to generate, when unmodulated, an optical beam having a given wavelength;

a modulator, configured to modulate the optical source or the optical beam using the LO signal, thereby generating a modulated optical signal comprising multiple optical signals having different wavelengths;

a first optical multiplexer, configured to extract the optical signals from the modulated optical signal;

multiple optical modulators, configured to modulate the extracted optical signals with respective baseband signals to produce baseband modulated optical signals; and a second optical multiplexer, configured to optically combine the baseband modulated optical signals to form a combined optical signal, and to transmit the combined optical signal over an optical fiber.

18. The transmitter according to claim 17, wherein the LO circuit is configured to generate the LO signal comprising the multiple LO signals by cyclically shifting a predefined bit pattern.

19. A method for communication, comprising:

generating an LO signal comprising multiple LO signals having different LO frequencies; and generating by an optical source, when unmodulated, an optical beam having a given wavelength;

modulating the optical source or the optical beam using the LO signal, thereby generating a modulated optical signal comprising multiple optical signals having different wavelengths;

extracting the optical signals from the modulated optical signal;

modulating the extracted optical signals with respective baseband signals to produce baseband modulated optical signals;

optically combining the baseband modulated optical signals to form a combined optical signal; and transmitting the combined optical signal over an optical fiber.

20. The method according to claim 19, wherein generating the LO signal comprises generating the LO signal comprising the multiple LO signals by cyclically shifting a predefined bit pattern.

* * * * *